Dec. 23, 1952  D. GRIMALDI  2,622,323
PIPE CUTTER
Filed Sept. 23, 1950
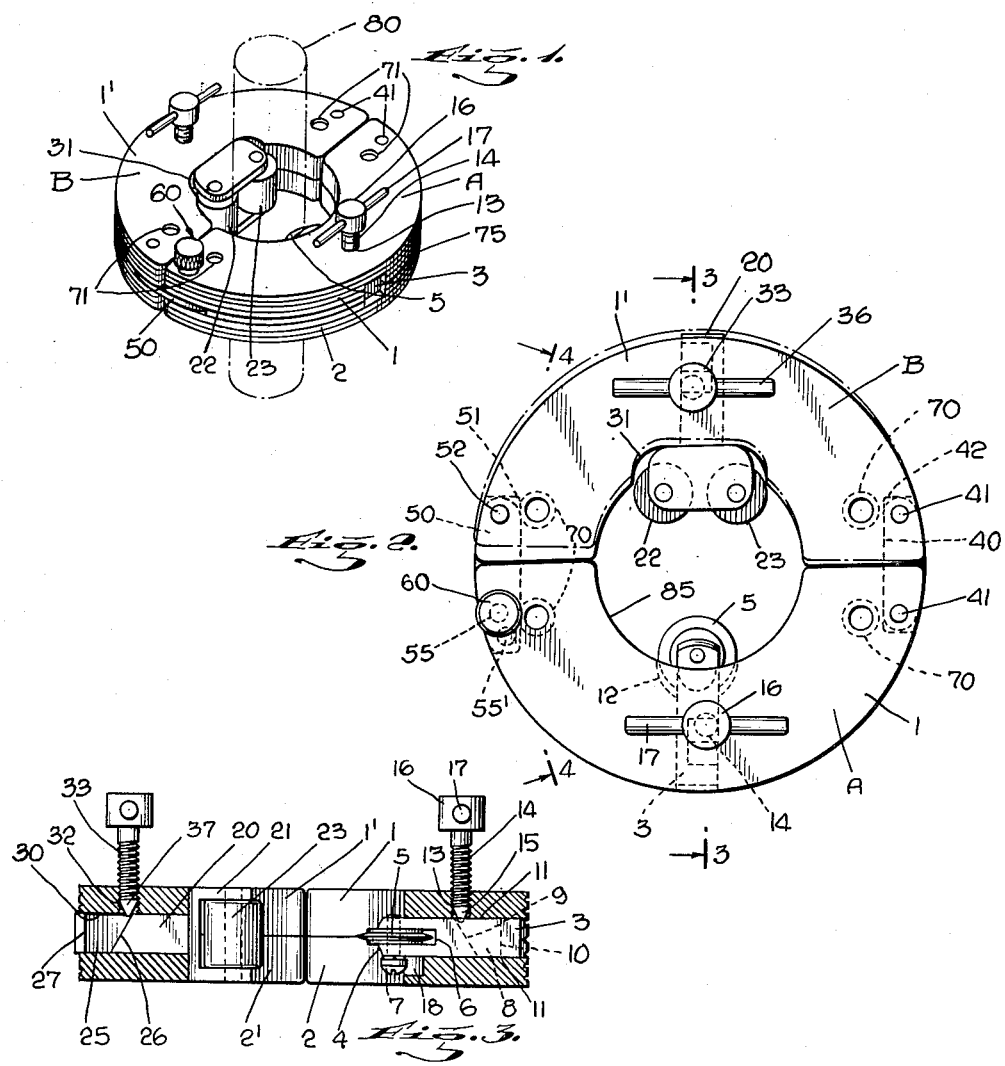
INVENTOR
DAVID GRIMALDI
BY
Henry I. Horridge
ATTORNEY Patented Dec. 23, 1952

2,622,323

UNITED STATES PATENT OFFICE 2,622,323

PIPE CUTTER

David Grimaldi, Crystal Lake, N. J.

Application September 23, 1950, Serial No. 186,469

6 Claims. (Cl. 30—101)

My invention relates to a pipe cutter. My pipe cutter comprises a body consisting of two substantially identical body members, of semi-ringlike form, hinged together at one side, with locking means at the opposite side, a radially adjustable shaft carrying a cutter housed in one of said body members, and an opposed radially adjustable shaft carrying a pair of rollers housed in the other body member, the radial adjustment of each of said shafts being accomplished by respective cam means, and means actuating said cam means.

The device of my invention is designed primarily for cutting the heavy copper tubing generally used in water and heating systems installed in houses.

In installing such systems, it is frequently necessary to cut the tubing in place, in cramped and confined locations. Thus in the installation of heating systems, at times risers, usually of ¾ inch outside diameter, located in the space between inner and outer walls, in frame construction usually about 3¾ inches, must be cut to the correct size with a free space of only 1½ inches on each side of the tubing. Again, the riser is brought out under the floor by a short section of tubing coupled at a right angle to the riser, and another short section, coupled to first named short section is brought up through and above the floor, as close as 2 inches to the inner wall, which must be cut, in place, to the correct height above the floor, for connection to the valve of the radiator. Other instances of cutting tubing in very close quarters occur in the installation of heating and water systems.

Cutting tubing at the cramped locations mentioned by available pipe cutters is a tedious and time consuming operation, requiring numerous shifts of the pipe cutter on the tubing.

While I have mentioned the usefulness of my invention in cutting tubing in the installation of water and heating systems, it has a much wider application, and I am not in any way limiting it to the fields of use in plumbing and heating systems.

Objects of my invention are: (1) to provide a pipe cutter which once adjusted to the tubing can be continuously turned around the tubing until the cut is completed, with no adjustment other than the gradual extension of the rollers and cutter as the cut deepens; (2) to provide a construction wherein both the rollers and the cutter are radially adjustable; (3) to provide such a pipe cutter which is adjustable to a plurality of pipe diameters; and (4) to provide a construction which permits the ready removal and replacement of the cutter and roller assemblies and other component parts.

Referring to the drawings:

Fig. 1 is a perspective view of one embodiment of my invention, showing in broken lines a small section of tubing gripped between the cutter and rollers.

Fig. 2 is a plan view.

Fig. 3 is a cross-section on the line 3—3 of Fig. 2.

Fig. 4 is a cross-section on the line 4—4 of Fig. 2.

As shown in the drawings, the body of the pipe cutter comprises two steel body members, A and B, of semi-ringlike form each, for convenience of manufacture composed of two laminations, 1 and 2. The cutter assembly of body member A comprises a shaft 3 of rectangular cross-section, slotted at its end 4 to receive the cutter wheel 5 which is rotatably secured to shaft 3 within slot 6 by a machine screw 7.

A cam slot 8 is cut in shaft 3, having an inclined side 9 and a vertical side 10. A lateral slot 11 is cut within body member A, midway between the top and bottom of body member A and extending laterally completely through body member A. Slot 11 is formed to receive shaft 3 with a fairly close sliding fit. An arcuate slot 12 is formed within body member A, midway between its top and bottom to permit the retraction therein of cutter wheel 5 to the extent of one-half of its diameter. A slot 18 is also cut within body member A to receive the head of machine screw 7 or a portion thereof.

Top lamination 1 of body member A is bored and threaded at 13 to receive a machine screw 14 having its lower end 15 tapered for engagement with the cam surface 9 of cam slot 8, and having an enlarged head 16 through which the handle pin 17 is inserted. Machine screw 14, constituting the cam engaging means, should be at a right angle to the upper surface of shaft 3, and the threaded bore 13 should be so located in top lamination 1 of body member A so that the tip of the tapered end of machine screw 14 will engage the upper part of the inclined side 9 of cam slot 8 when shaft 3 is wholly retracted in slot 6, as shown in Fig. 3.

The roller assembly of body member B comprises a shaft 20 of rectangular cross section corresponding to cutter shaft 3, and having a bracket 21 at its outer end and in which rollers 22, 23 are rotatably mounted. A cam slot 25, similar to cam slot 8 is cut in shaft 20, having an inclined side 26 and a vertical side 27.

A lateral slot 30, similar to slot 11 in body member A, is cut within body member B, midway between the top and bottom of body member B and extending laterally completely through body member B, in alignment with slot 11 of body member A. Slot 30 is formed to receive shaft 20 with a fairly close sliding fit. A concave slot 31 is formed in body member B to receive a portion of bracket 21 and rollers 22, 23 when shaft 20 is fully retracted in slot 30.

Top lamination 1' of body member B is bored and threaded at 32 to receive a machine screw 33, similar to screw 14, having its lower end tapered for engagement with the cam surface 26 of cam slot 25, and having an enlarged head 34 through which the handle pin 36 is inserted. Machine screw 33, constituting the cam engaging means, should be at a right angle to the upper surface of body member B and the bore 32 should be so located in top lamination 1' of body member B so that the tip of the tapered end 37 will engage the upper portion of the inclined side 26 of cam slot 25 when shaft 20 is wholly retracted in slot 30, as shown in Fig. 3.

Body members A and B are hinged together by a link 40, pivotally secured at one end thereof to body member B and at the other end to body member A by pivot pins indicated at 41 (Figs. 1, 2). Link 40 is seated in an interior slot cut in body members A and B, indicated at 42 in Fig. 2.

The means for locking body members A and B together comprise a link 50 similar to link 40, seated in an interior slot 51 cut in body members A and B (Figs. 2, 3), pivotally secured to body member B at one end by pivot pin 52, a plurality of holes 55, 55' being formed at the opposite end of link 50, to provide for adjustment of said pipe cutter to tubing of varying outside diameters.

A bore 56 is formed through body member A in registry with hole 55 in link 50, both said bore and hole being located to agree with the fully closed position of body members A and B as shown in Fig. 4.

A locking pin 60 is provided for insertion in bore 56 in body member A, through one of the holes 55, 55' of link 50, according to the size of tubing to be cut. Locking pin 60, has an enlarged portion 61, of greater diameter than that of bore 56, and a still further enlarged knurled head 62. The lower portion 63 of locking pin 60 is of a diameter to furnish a fairly close sliding fit within bore 56, its extreme lower end 64 being tapered to facilitate its entry in one of holes 55, 55'. The remaining portion 65 of locking pin 60, is of lesser diameter than that of bore 56. Bore 56 is initially bored to a uniform diameter. Locking pin is then inserted into it, and the upper end 66 of bore 56 is peened over so as to restrict the opening at 66 of bore 56 to a diameter less than that of the lower portion 63 of locking pin 60. This construction, while it enables locking pin 60 to be retracted sufficiently to engage any of holes 55, 55' of link 50, prevents locking pin 50 from being completely withdrawn from bore 56, as shoulder 67 of locking pin 60 cannot pass the restricted opening at 66 of bore 56.

Laminations 1, 2 of body member A and 1', 2' of body member B are secured together by machine screws 70 through threaded bores 71 in said body members.

Forming body members A and B in said laminations greatly simplifies the machining of the various slots therein hereinbefore described. Pivot pins 41 of link 40, and pivot pin 52 of link 50 are drive fits.

To disassemble body members A and B, screws 70 are withdrawn, pivot pins 41 and 52 are driven out, machine screws 14 and 33 are retracted, and top laminations 1 and 1' are simply lifted off bottom laminations 2, 2' of body members A and B. The cutter wheel and roller assemblies may then be lifted off lower laminations 2, 2' of body members A, B.

The sides 75 of body members A, B, are corrugated to provide a frictional grip.

The operation of the device is as follows:

Lock pin 60 is retracted so as to disengage the hole 55, 55' of locking link 51, and body members A and B are then opened, the cutter wheel 5 and rollers 22, 23 are fully retracted. The device is then closed around the pipe to be cut and locked. Cutter wheel shaft 3 and roller wheel shaft 20 are then advanced by turning down machine screws 14 and 33, which engage, respectively, cam surfaces 9 and 26 in shafts 3 and 20, thereby moving said shafts towards the pipe 80 to be cut until both cutter wheel 5 and rollers 22, 23 engage pipe 80 on opposite sides, as shown in Fig. 1. Preferably shafts 3 and 20 are equidistantly thus advanced. The operator then grasps the sides 75 of body members A and B and turns the device a short distance to the right and left to get a starting cut in pipe 80. He then proceeds to turn said pipe cutter around pipe 80, at intervals further advancing cutter wheel 3 and rollers 22, 23 against the pipe to provide a deeper cut, and thus proceeds until the cut has been completed. Once said pipe cutter has been placed around the pipe at the place of the proposed cut, it is never necessary to shift its position on the pipe other than to continuously turn it around the pipe.

Various modifications in the embodiment of my invention shown in the drawings may be made which nevertheless will come within the scope of my invention.

Thus different cam means and means actuating the cam means, different locking means, different means to hinge the body members together, cutter wheel and roller wheel shafts of different cross section, than those shown in the drawings, as well as other changes, without departing from my invention, may be provided.

It will be noted that none of the parts associated with body members A and B extend laterally outside of the peripheries of said body members, so that the outside diameter of the combined body members A and B always constitutes the diameter of the device.

I have found that a device constructed in accordance with the drawings having the following dimensions, is suitable and effective, namely: outside diameter of body members A and B when in the closed position shown in Fig. 3, 3½ inches; diameter of opening 85 when body members are in said last named position, 1⅝ inches; holes 55, 55' in locking link 51, are spaced ¼ inch apart, on centers, hole 55 permitting said device to be used on pipes of ½ inch and ⅝ inch outside diameter, and hole 55' for ¾ inch outside diameter pipe.

I claim:

1. A pipe cutter comprising two opposed body members together comprising a body having a central opening, to encompass the pipe to be cut, hinge means securing said body members together at one end of each, and locking means removably securing them together at the opposite end of each, a slot extending through the periphery of each said body member transversely of the axis of said body into said central opening, a carrier block mounted in each of said slots for movement therein transversely of the axis of said body, one of said carrier blocks carrying pipe cutting means at its inner end and the other said carrier block carrying pipe engaging means at its inner end, cam means contained in each of said carrier blocks, cam actuating means adjustably mounted in a face of each said body member inside of its periphery in association with said cam means for actuating said carrier block from said face of said body member, inwardly, towards the pipe to be cut, said carrier blocks, hinge means and locking means being contained whereby no part thereof will protrude outwardly from the periphery of said body.

2. A pipe cutter comprising two opposed substantially semi-cylindrical body members, together comprising a body having a central opening to encompass the pipe to be cut, hinge means securing said body members together at one end of each, and locking means removably securing them together at the opposite end of each, a slot extending through the periphery of each said body member transversely of the axis of said body into said central opening, a carrier block mounted in each of said slots for movement therein transversely of the axis of said body, one of said carrier blocks carrying pipe cutting means at its inner end and the other said carrier block carrying pipe engaging means at its inner end, a cam slot formed in each said carrier block having an inclined surface, means adjustably mounted in a face of each said body member parallel to the axis of said body member and inside of its periphery in association with said inclined face of said cam slot for actuating said carrier block, from said face of said body member, inwardly, towards said central opening, means preventing said carrier blocks from rotating, means preventing said carrier blocks from protruding outwardly from the periphery of said body, said hinge means being contained, and said locking means being contained in the closed position of said body members, without protrusion outwardly from the periphery of said body.

3. An external pipe cutter comprising two opposed substantially semi-cylindrical body members together comprising a body having a central opening to encompass the pipe to be cut, hinge means secured to said body members at one end thereof of each, locking means removably securing them together at their opposite ends, a slot of angular cross-section extending through the periphery of each said body member into said central opening, in diametric relationship, a carrier block of angular cross-section conforming to said cross-section of said slots, slidably mounted in each of said slots, for radial movement therein, one of said carrier blocks carrying pipe cutting means at its inner end, and the other said carrier blocks carrying roller means at its inner end, a cam slot in each of said carrier blocks having an inclined surface, cam actuating means adjustably mounted in each said body member perpendicular to its face in association with said inclined surface of said cam slot for manual actuation, inside of the periphery of said body member, of said carrier, inwardly towards said central opening.

4. An external pipe cutter in accordance with claim 3, in which each said body member is composed of two identical laminations, removably secured together.

5. An external pipe cutter in accordance with claim 3 in which one said carrier member carries at its inner end, rotatably mounted therein, a pipe cutting disc, and the other said carrier block carries at its inner end a pair of rollers, laterally spaced.

6. An external pipe cutter in accordance with claim 3, in which said hinge means are wholly contained within said body members, and in which said locking means comprises a latch pivotally mounted wholly within said body members when the latter are in closed position, and a latch engaging member, adjustably mounted through the face of one said body member, perpendicular thereto, inside of its periphery, for engagement with said latch.

DAVID GRIMALDI.

REFERENCES CITED

The following references are of record in the file of this patent:

UNITED STATES PATENTS

| Number | Name | Date |
| --- | --- | --- |
| 501,269 | Cumming | July 11, 1893 |
| 646,722 | Barhydt | Apr. 3, 1900 |
| 1,193,853 | White | Aug. 8, 1916 |
| 2,448,578 | Condon | Sept. 7, 1948 |